United States Patent
Hung

(10) Patent No.: US 12,270,481 B2
(45) Date of Patent: Apr. 8, 2025

(54) FAUCET

(71) Applicant: Jui Mu Hung, Taiwan (TW)

(72) Inventor: Jui Mu Hung, Taiwan (TW)

( * ) Notice: Subject to any disclaimer, the term of this patent is extended or adjusted under 35 U.S.C. 154(b) by 204 days.

(21) Appl. No.: 18/198,120

(22) Filed: May 16, 2023

(65) Prior Publication Data
US 2023/0287986 A1     Sep. 14, 2023

(51) Int. Cl.
*F16K 11/00*     (2006.01)
*E03C 1/04*     (2006.01)

(52) U.S. Cl.
CPC .......... *F16K 19/006* (2013.01); *E03C 1/0404* (2013.01)

(58) Field of Classification Search
CPC .. F16K 19/006; E03C 1/0404; E03C 2201/40; E03C 1/04; E03C 1/102
USPC ..... 4/619, 671, 673, 675–678; 137/801, 216
See application file for complete search history.

(56) References Cited

U.S. PATENT DOCUMENTS

| | | | |
|---|---|---|---|
| 5,865,209 A * | 2/1999 | Vidal | E03C 1/102 |
| | | | 137/216 |
| 7,011,106 B2 * | 3/2006 | Kawolics | E03C 1/04 |
| | | | 137/801 |
| 8,733,386 B2 * | 5/2014 | Sun | E03C 1/102 |
| | | | 137/801 |
| 11,313,111 B1 * | 4/2022 | Chen | E03C 1/102 |
| 11,634,897 B2 * | 4/2023 | Watkins, Jr. | E03C 1/102 |
| | | | 4/678 |
| 2021/0236991 A1 * | 8/2021 | Schneidewend | B01D 61/04 |

FOREIGN PATENT DOCUMENTS

TW     M424419 U    *    3/2012

\* cited by examiner

*Primary Examiner* — Tuan N Nguyen

(57) ABSTRACT

A faucet device includes a faucet body including a faucet spigot communicating with a channel, a handle, and a fastening member; and a valve including a hollow cylinder, a fastening element on a top of the hollow cylinder and complementarily secured to the fastening member, a drain seat on a bottom of the hollow cylinder, a first hole through the drain seat and having a first tunnel through the drain seat, an inlet connector secured to the first hole, a second hole through the drain seat and having a second tunnel through the drain seat, an outlet connector secured to the second hole, a curved tube having a first end secured to the first tunnel and a second end passing through the second tunnel into the outlet connector, and a vent having a first end communicating with the second tunnel and a second end communicating with the atmosphere.

3 Claims, 5 Drawing Sheets

FAUCET

BACKGROUND OF THE INVENTION

1. Field of the Invention

The invention relates to plumbing fixtures and more particularly to a faucet having an air gap at an end of a vent to prevent siphoning of unfiltered water from a drain into a filter.

2. Description of Related Art

In recent years, the rapid industrial development has caused serious pollution to the air, the land, and water sources. People may pay attention to health and hygiene. People may use a filter to filter tap water in order to obtain clean drinking water. Taking a reverse osmosis (RO) water filter as an example, it uses a partially permeable membrane to separate ions, unwanted molecules, and larger particles from drinking water. Incoming water is fed through the membrane under high pressure, the filtered water is stored in a water storage tank, and the liquid containing the larger particles blocked by the membrane is removed before discharge. When the RO water filter filters the tap water, a large amount of unfiltered water is generated. A waste water pipe is used to flow the unfiltered water into a drain of a sink prior to discharge. However, water is in the waste water pipe connected to the discharge pipe may be affected by siphoning, and the unfiltered water will flow back to the filter, thereby polluting filtration components. Therefore, in some countries, regulations require that the waste water pipe connected to the drain be provided with an air gap device for preventing siphoning of unfiltered water from the drain into the filter. The waste water pipe is usually connected to a faucet body of a faucet, and an air gap device is provided in the faucet body and in fluid communication with the waste water pipe. However, the components of the faucet with the air gap device are extremely complex, which not only makes manufacturing or assembling difficult, but also increases the overall manufacturing cost. Thus, faucet manufacturers may manufacture one type of faucet having an air gap device and the other type of faucet without an air gap device separately in response to the requirements of different national regulations. It inevitably increases the storage cost of filtration components.

Thus, the need for improvement still exists.

SUMMARY OF THE INVENTION

It is therefore one object of the invention to provide a faucet comprising a faucet body including a channel, a curved faucet spigot in fluid communication with the channel, a rotatable handle configured to open or close the faucet spigot, and a fastening member distal the faucet spigot and proximate the handle; and a valve including an upper, hollow cylinder, a space defined by the upper, hollow cylinder, a fastening element disposed on a top of the upper, hollow cylinder and configured to complementarily secure to the fastening member, a drain seat disposed on a bottom of the upper, hollow cylinder, a first hole through a bottom of the drain seat and having a first tunnel through the drain seat, an inlet connector secured to the first hole, a second hole through the bottom of the drain seat and having a second tunnel through the drain seat, an outlet connector secured to the second hole, a curved tube having a first end secured to the first tunnel and a second end passing through the second tunnel into the outlet connector, and a vent having a first end in fluid communication with the second tunnel and a second end in fluid communication with an outer surface of the upper, hollow cylinder.

The above and other objects, features and advantages of the invention will become apparent from the following detailed description taken with the accompanying drawings.

DETAILED DESCRIPTION OF THE INVENTION

Figure 1:
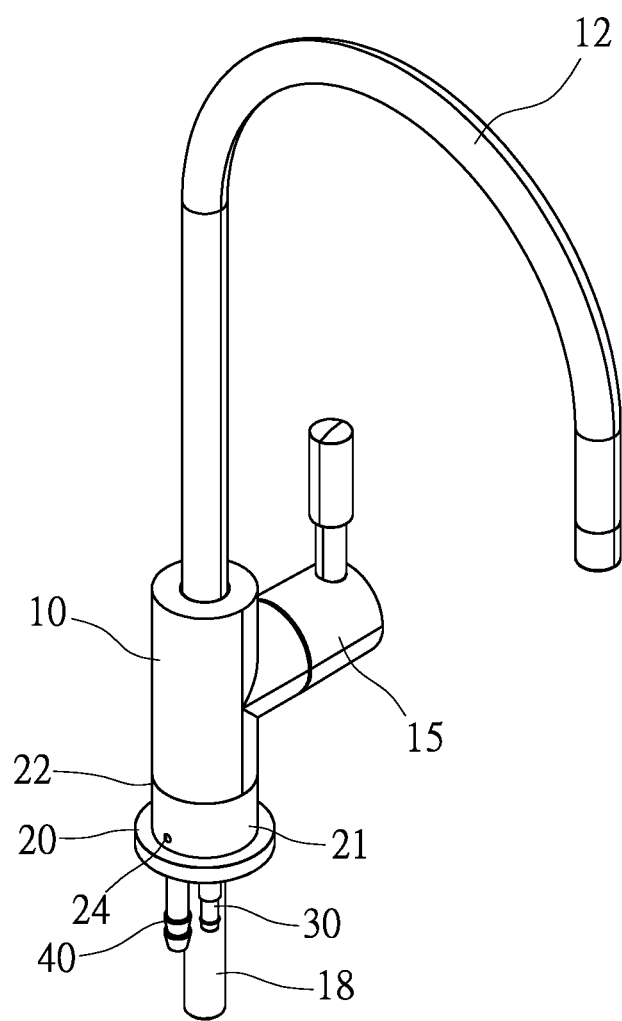
FIG. 1 is a perspective view of a faucet according to a first preferred embodiment of the invention.
Figure 2:
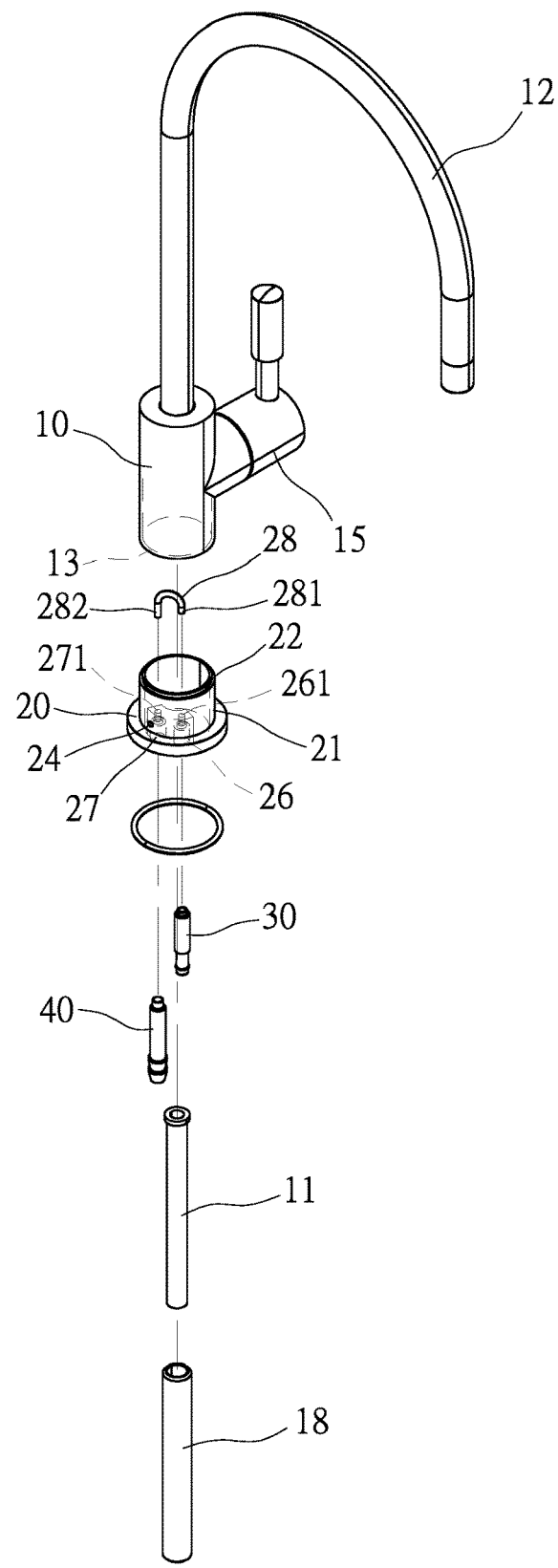
FIG. 2 is an exploded view of the faucet in FIG. 1.
Figure 3:
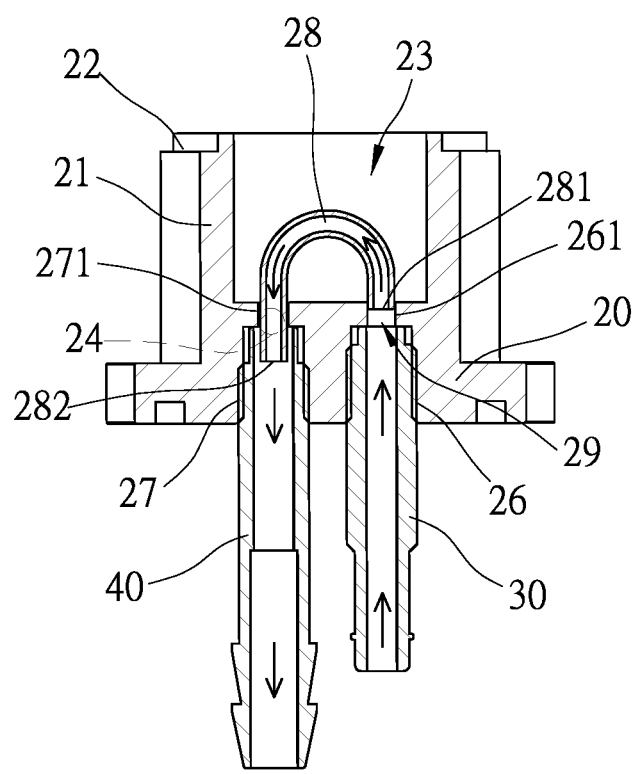
FIG. 3 is a longitudinal sectional view of a lower portion of the faucet in FIG. 1.
Figure 4:
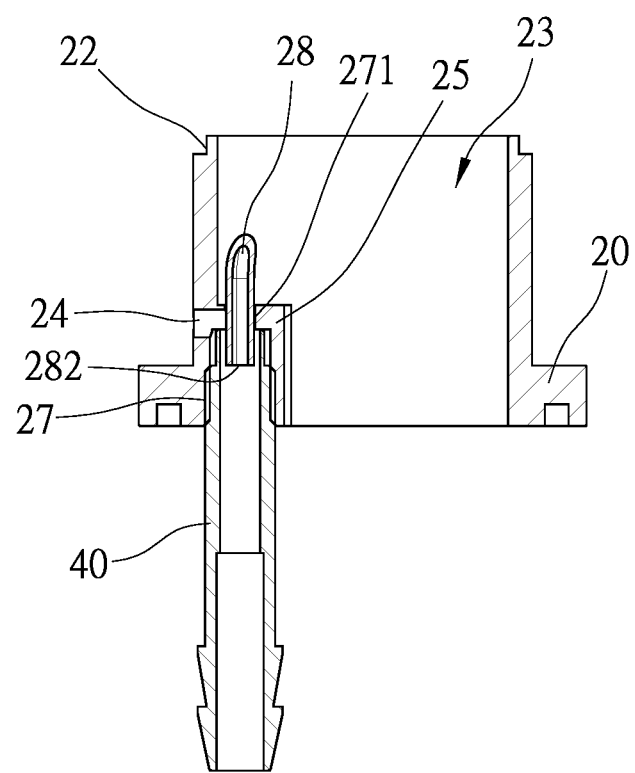
FIG. 4 is another longitudinal sectional view of the lower portion of the faucet in FIG. 1.

Referring to FIGS. 1 to 4, a faucet in accordance with a first preferred embodiment of the invention comprises the following components as discussed in detail below.

A faucet body 10 includes a channel 11 having a first end in fluid communication with an outlet of a filter (not shown), a sleeve 18 disposed on the channel 11 and secured to a sink (not shown), a curved faucet spigot 12 in fluid communication with a second end of the channel 11, a rotatable handle 15 configured to open or close the faucet spigot 12 and increase or decrease the volume of flow through the faucet spigot 12, and a fastening member 13 distal the faucet spigot 12 and proximate the handle 15.

A valve 20 includes an upper, hollow cylinder 21, a space 23 defined by the upper, hollow cylinder 21, a fastening element 22 disposed on a top of the upper, hollow cylinder 21 and configured to complementarily secure to the fastening member 13 by snapping, thereby fastening the faucet body 10 and the valve 20 together, a drain seat disposed on a bottom of the upper, hollow cylinder 21, a first hole 26 through a bottom of the drain seat 25 and having a first tunnel 261 through the drain seat 25, an inlet connector 30 secured to the first hole 26, a second hole 27 through the bottom of the drain seat 25 and having a second tunnel 271 through the drain seat 25, an outlet connector 40 secured to the second hole 27 and being in fluid communication with a drain pipe (not shown) of the filter, a curved tube 28 having a first end 281 secured to the first tunnel 261 and a second end 282 passing through the second tunnel 271 into the outlet connector 40, a gap 29 formed between the first end 281 and the inlet connector 30, and a vent 24 having a first end in fluid communication with the second tunnel 271 and a second end in fluid communication with an outer surface of the upper, hollow cylinder 21.

Figure 5:
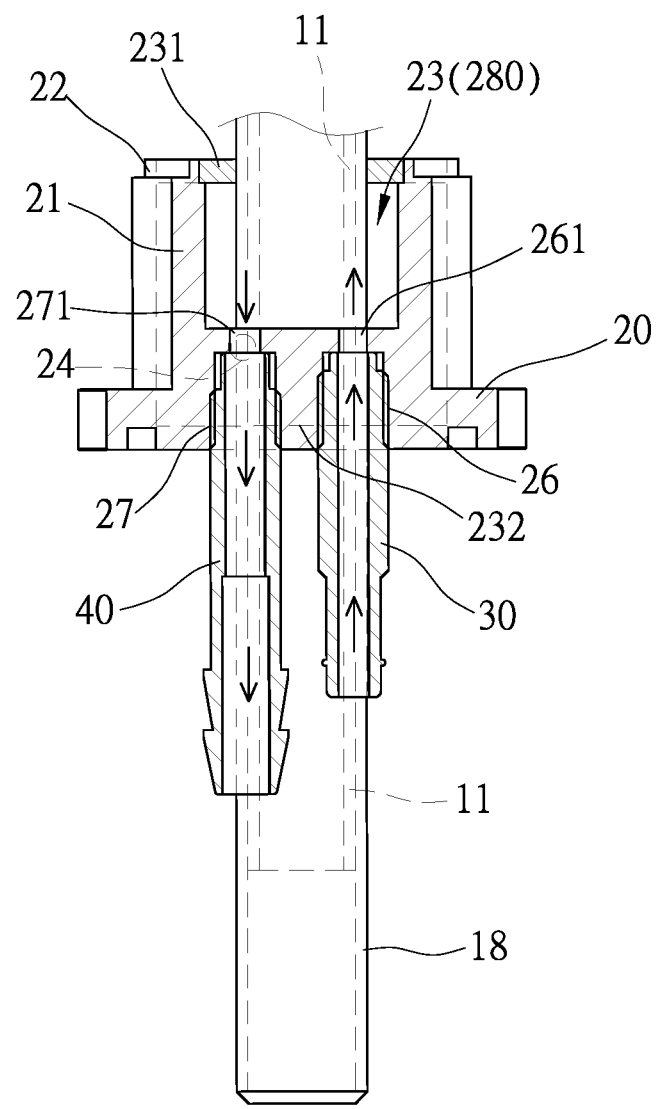
FIG. 5 is a longitudinal sectional view of a lower portion of a faucet according to a second preferred embodiment of the invention.

An outlet of unfiltered water of the filter is connected to the inlet connector 30 and the outlet connector 40 is connected to a drain (not shown). In operation, the unfiltered water of the filter flows through the inlet connector 30, the curved tube 28, and the outlet connector 40 into the drain. An air gap is formed at the second end of the vent 24 to prevent siphoning of the unfiltered water from the drain into the filter. Referring to FIG. 5, a faucet in accordance with a second preferred embodiment of the invention is shown. The characteristics of the second preferred embodiment are substantially the same as that of the first preferred embodiment except the following: a top cap 231 is formed on a top of the upper, hollow cylinder 21. A bottom cap 232 is formed on a bottom of the upper, hollow cylinder 21. The sleeve 18 passes through the bottom cap 232 and the top cap 231. A passageway 280 is formed through the space 23, the first tunnel 261, and the second tunnel 271 for flowing unfiltered water. An air gap is formed at the second end of the vent 24 to prevent siphoning of the unfiltered water from the drain into the filter.

While the invention has been described in terms of preferred embodiments, those skilled in the art will recognize that the invention can be practiced with modifications within the spirit and scope of the appended claims.

What is claimed is:

1. A faucet, comprising:
   a faucet body including a channel, a curved faucet spigot in fluid communication with the channel, a rotatable handle configured to open or close the faucet spigot, and a fastening member proximate the handle; and
   a valve including an upper, hollow cylinder, a space defined by the upper, hollow cylinder, a fastening element disposed on a top of the upper, hollow cylinder and configured to complementarily secure to the fastening member, a drain seat disposed on a bottom of the upper, hollow cylinder, a first hole through a bottom of the drain seat and having a first tunnel through the drain seat, an inlet connector secured to the first hole, a second hole through the bottom of the drain seat and having a second tunnel through the drain seat, an outlet connector secured to the second hole, a curved tube having a first end secured to the first tunnel and a second end passing through the second tunnel into the outlet connector, and a vent having a first end in fluid communication with the second tunnel and a second end in fluid communication with an outer surface of the upper, hollow cylinder.

2. The faucet of claim 1, further comprising a gap formed between the first end of the curved tube and the inlet connector.

3. The faucet of claim 1, further comprising a sleeve disposed on the channel.

* * * * *